(12) United States Patent
Yadav et al.

(10) Patent No.: US 6,272,540 B1
(45) Date of Patent: Aug. 7, 2001

(54) ARRANGEMENT AND METHOD FOR PROVIDING FLEXIBLE MANAGEMENT OF A NETWORK

(75) Inventors: Satyendra Yadav; Vikas Aditya; Raj S. Yavatkar, all of Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/224,030

(22) Filed: Dec. 31, 1998

(51) Int. Cl.$^7$ ....................................................... G06F 13/00
(52) U.S. Cl. ............................................ 709/223; 709/217
(58) Field of Search .................................... 709/223, 217, 709/219; 707/10

(56) References Cited

U.S. PATENT DOCUMENTS

| | | | |
|---|---|---|---|
| 5,351,243 | * | 9/1994 | Kalkunte et al. ..................... 370/475 |
| 5,805,808 | * | 9/1998 | Hasani et al. ......................... 709/243 |
| 5,893,091 | * | 4/1999 | Hunt et al. .............................. 707/3 |
| 5,909,686 | * | 6/1999 | Muller et al. ......................... 707/104 |

FOREIGN PATENT DOCUMENTS 0 605 106    7/1994   (EP) .
97/37477    10/1998   (WO) .

OTHER PUBLICATIONS

Belaji R. Venkatraman: "Subscriber Profile Manager: A Customer Network Management Tool" Proceedings of the Network Operations and Management Symposium (NOMS), US, New York, IEEE, vol. SYMP. 4, 1994, pp. 153–162, XP000452404 ISBN: 0–7803–1812–9 p. 160, paragraph 1 –paragraph 2.

* cited by examiner

*Primary Examiner*—Kenneth R. Coulter
(74) *Attorney, Agent, or Firm*—Kenyon & Kenyon

(57) ABSTRACT

Described is a method and arrangement for managing a network which is coupling at least a first component and a remote component. A database is transmitted from the first component to the remote component via the network. The database includes filter data having at least one condition and action data corresponding to the at least one condition. A data packet is transmitted from the first component to the remote component via the network. The data packet includes a plurality of fields and data. The fields of the data packet are filtered at the remote component to determine if the at least one condition is satisfied.

29 Claims, 8 Drawing Sheets

NETWORK MANAGEMENT DATABASE 600

| | Condition Component | Action Component |
|---|---|---|
| Query1 | IF source IP address of packet is "User A" AND description field of packet is "Urgent" | THEN send a copy of packet to User B and User C AND set priority to "1" |
| | | |
| | | |
| | | |
| | | |

FIG. 6a

NETWORK MANAGEMENT DATABASE 600

|  | Condition Component | Action Component |
|---|---|---|
| Query1 | IF Filter A<br><br>AND Filter B | THEN Action I<br><br>AND Action II |
|  |  |  |
|  |  |  |
|  |  |  |

FIG. 6b

FILTER DATABASE 640

| Filter | Description |
|---|---|
| Filter A | source IP address of packet is "User A" |
| Filter B | description field of packet is "Urgent" |
|  |  |

FIG. 6c

ACTION DATABASE 680

|  | Description |
|---|---|
| Action I | send a copy of packet 200 to User B and User C |
| Action II | set priority to "1" |
|  |  |

FIG. 6d

ARRANGEMENT AND METHOD FOR PROVIDING FLEXIBLE MANAGEMENT OF A NETWORK

FIELD OF THE INVENTION

The present invention relates to an arrangement and method for providing a flexible management of a network.

BACKGROUND OF THE INVENTION

Most of conventional network interface cards ("NICs") are essentially passive devices. A basic functionality of the conventional NICs is to send and/or receive data packets between components (e.g., desktops, servers, etc.) of the network. In addition, the conventional NICs provide a simple management and a consistent level of performance in switched or shared networks regardless of a software application. The conventional NICs do not directly "interact" with other network components and do not participate in managing of network resources and services.

Some conventional software applications for managing the network, groupware, priority business applications, multicast-based applications, and multimedia applications require the network to be capable of monitoring traffic levels, enforcing policies and adjusting the resource. Delivering these and other functionalities (e.g., creating a virtual local area network ("VLAN")) while controlling complexity, requires that the network components interact with the network.

Although, there are some conventional network packet classification (or filtering) systems which are utilized in conventional networks (e.g., a network sniffer), such conventional network packet classification systems are primitive and do not provide assistance in an intelligent network management.

SUMMARY OF THE INVENTION

The present invention relates to a method and arrangement for managing a network which is coupling at least a first component and a remote component. A database is transmitted from the first component to the remote component via the network. The database includes filter data having at least one condition and action data corresponding to the at least one condition. A data packet is transmitted from the first component to the remote component via the network. The data packet includes a plurality of fields and data. The fields of the data packet are filtered at the remote component to determine if the at least one condition is satisfied.

BRIEF DESCRIPTION OF THE DRAWINGS

FIG. 6a shows an embodiment of a Network Management Database according to the present invention.

FIG. 6b shows another embodiment of the Network Management Database according to the present invention.

FIG. 6c shows an embodiment of a Filter Database according to the present invention.

FIG. 6d shows an embodiment of an Action Database according to the present invention.

DETAILED DESCRIPTION OF THE INVENTION

Described below is an embodiment of an electronic arrangement or system 100 and a method according to the present invention which provide for a variety of networking functions (e.g., intelligent network monitoring, remote configuration and control, traffic prioritization, and access control).

Figure 1:
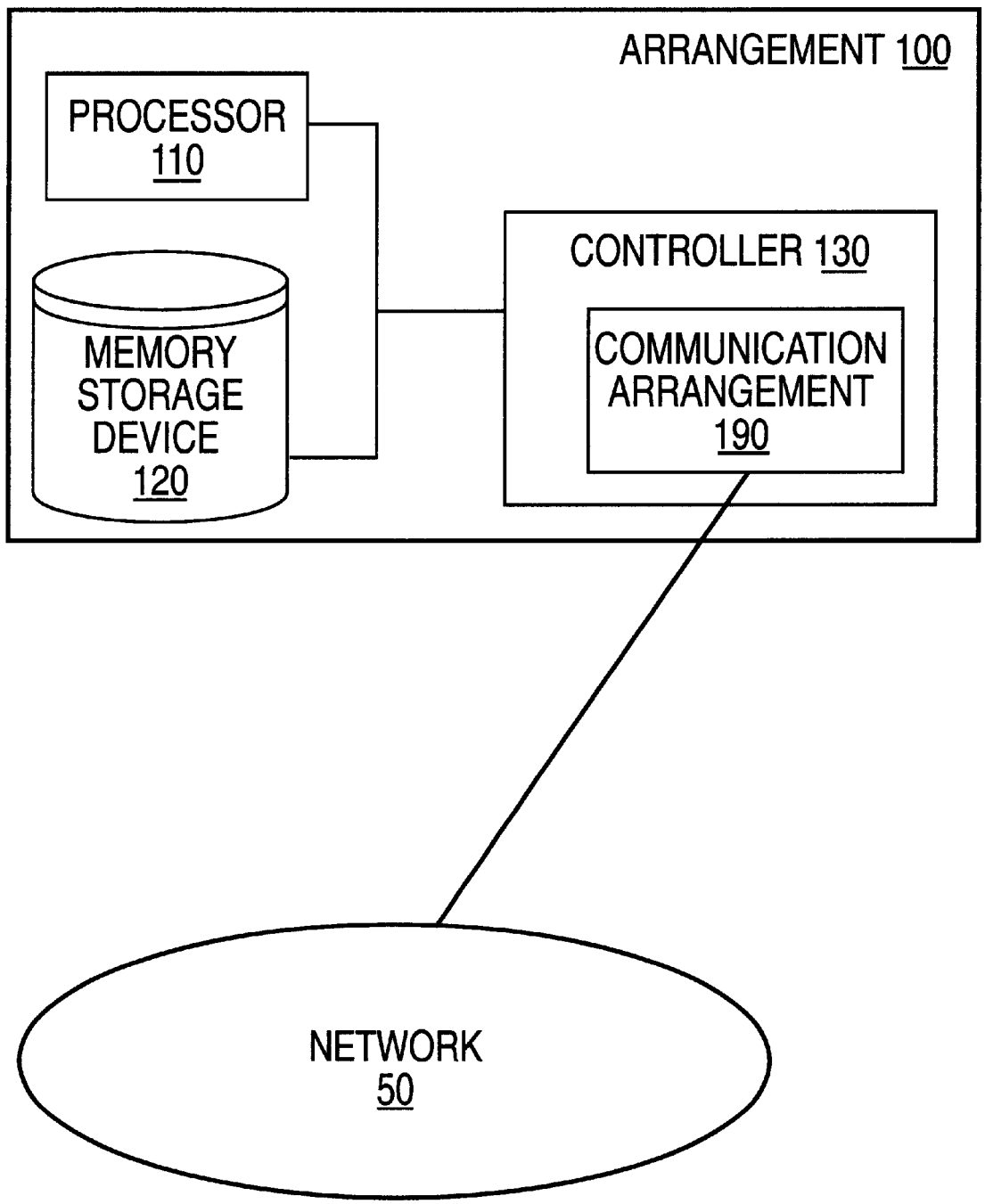
FIG. 1 shows an electronic arrangement coupled to a network according to an embodiment of the present invention.

FIG. 1 shows an embodiment of arrangement 100 which is coupled to a communication network 50. Network 50 may be, e.g., a local area network, a wide area network, the Internet, etc. Arrangement 100 may be a network server, a network switch, a network router, a personal computer, a network computer, a laptop, a personal digital assistant, etc. A plurality of electronic components, similar to arrangement 100, may be connected to network 50.

Figure 2:
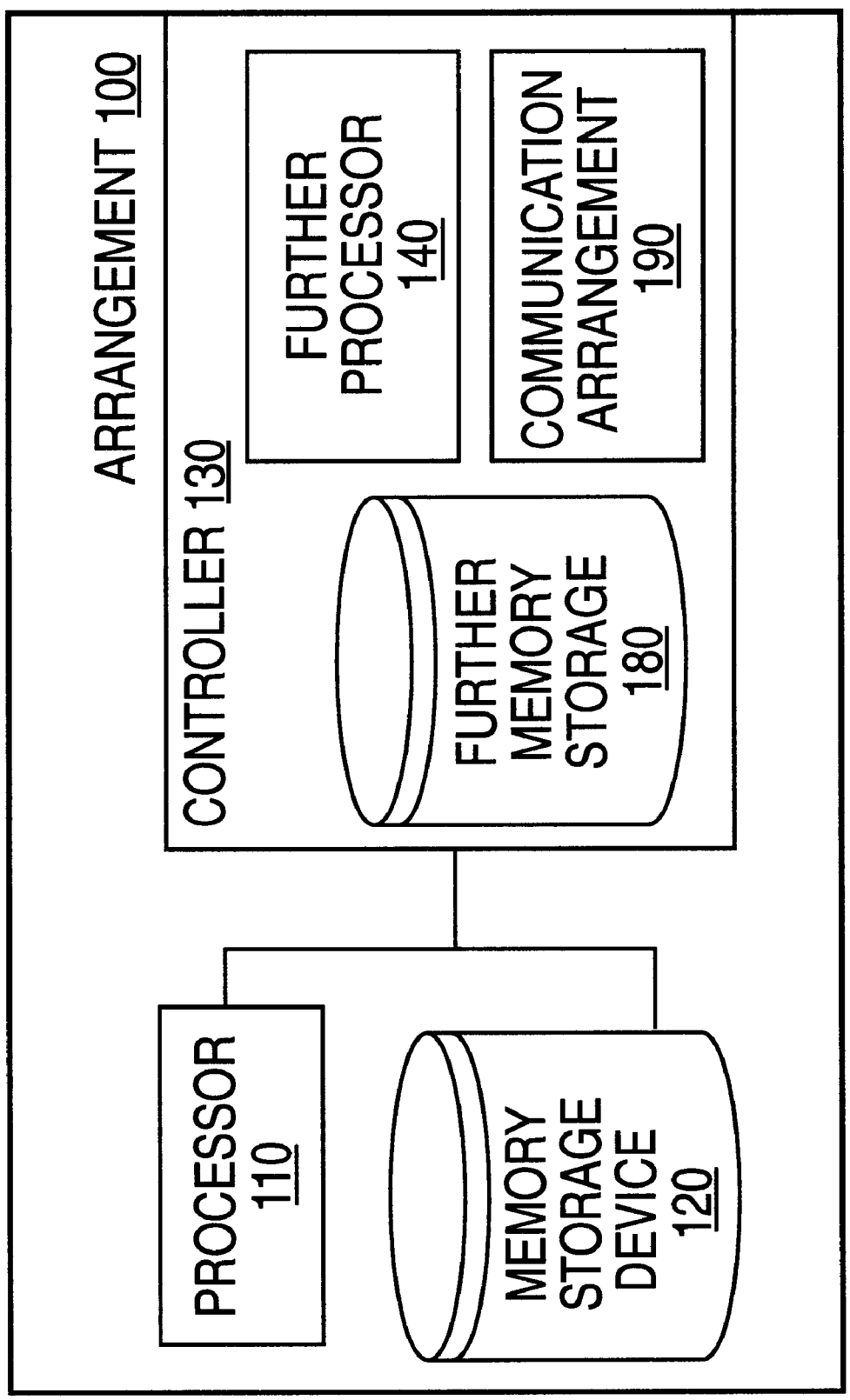
FIG. 2 shows another embodiment of the arrangement of FIG. 1 according to an embodiment of the present invention.

Arrangement 100, as well as the components of network 50, may include a processor 110 (e.g., an Intel Pentium® II processor), a memory storage device 120 and a network controller 130. Controller 130 facilitates communication between arrangement 100 and the components coupled to network 50 by transmitting (e.g., receiving and/or sending) a data packet 200 (see, e.g., FIGS. 3a and 3b). Controller 130 may include a communication arrangement 190 for transmitting packet 200. In this embodiment, communication arrangement 190 is controlled by a software driver which is stored in memory storage device 120. In another embodiment according to the present invention, shown in FIG. 2, controller 130 may include a further processor 140 and a further memory storage device 180.

Figure 3A:
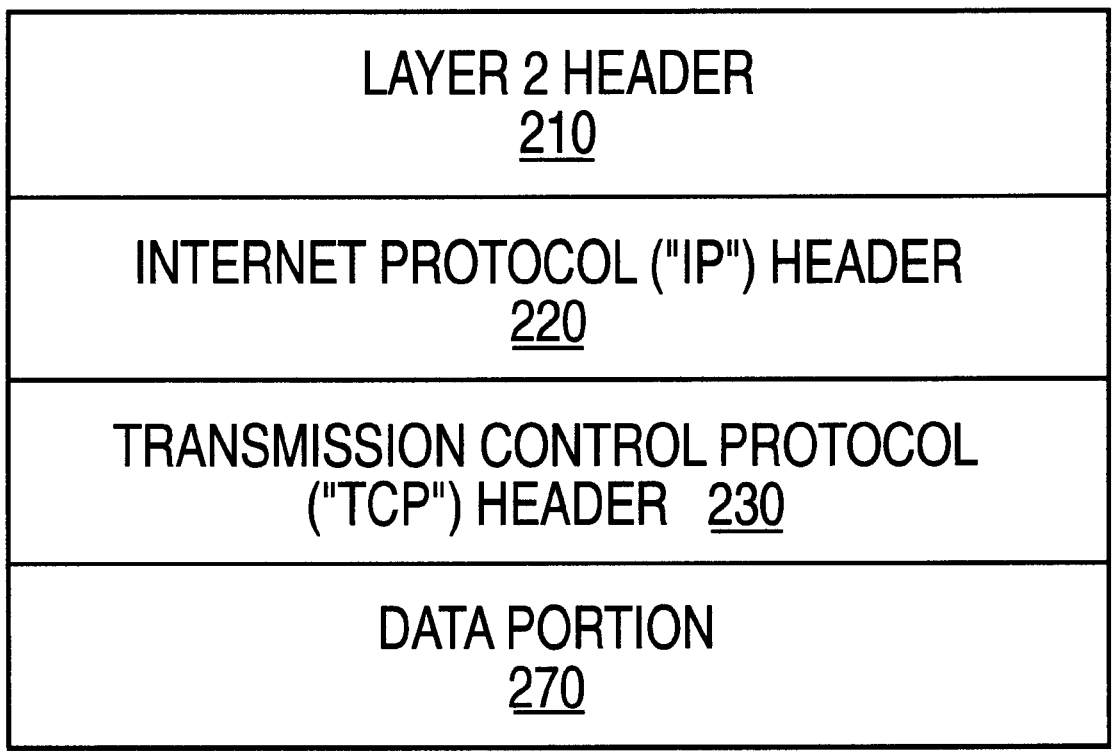
FIG. 3a shows an embodiment of a data packet.

Packet 200 is utilized to transmit data to and from arrangement 100. FIG. 3a shows an embodiment of packet 200 which may include, e.g., four parts: a layer 2 header 210, Internet Protocol ("IP") header 220, Transmission Control Protocol ("TCP") header 230 and a data portion 270. A configuration of packet 200 may depend, e.g. on a type of network 50 and a network protocol which is being used by network 50.

Layer 2 header 210 may include a Destination Media Access Control ("MAC") address, a Source MAC Address and a Type field (e.g., a protocol type at MAC layer). IP header 220 may include a plurality of fields containing, e.g., the following information: version, type of service, total length of packet 200, identification, flags, fragment offset, time to live ("TTL"), protocol, header checksum, Source IP Address, Destination IP Address, options, padding. (See Internet Data Protocol, Internet RFC 791, September 1981). TCP header 230 may include a Source Port and a Destination Port. (See Transmission Control Protocol (TCP), Internet RFC 793, September 1981).

Data part 270 includes the data which is being transmitted by packet 200. In addition, data part 270 may include fields characterizing the data, e.g., a description field may include a description of the data and a type field may include an indication of a type of the data. Those skilled in the art would understand that packet 200 may include additional part(s) and that each part of packet 200 may include at least one field containing predetermined information.

Arrangement 100 and the method according the present invention provide a flexible management of network 50. For instance, arrangement 100 and the method allow an intelligent monitoring, a remote configuration and control, a traffic prioritization, and a controlled access of network 50. This is an exemplary list of the network functions; other network functions would be readily apparent to one skilled in the art.

Figure 4:
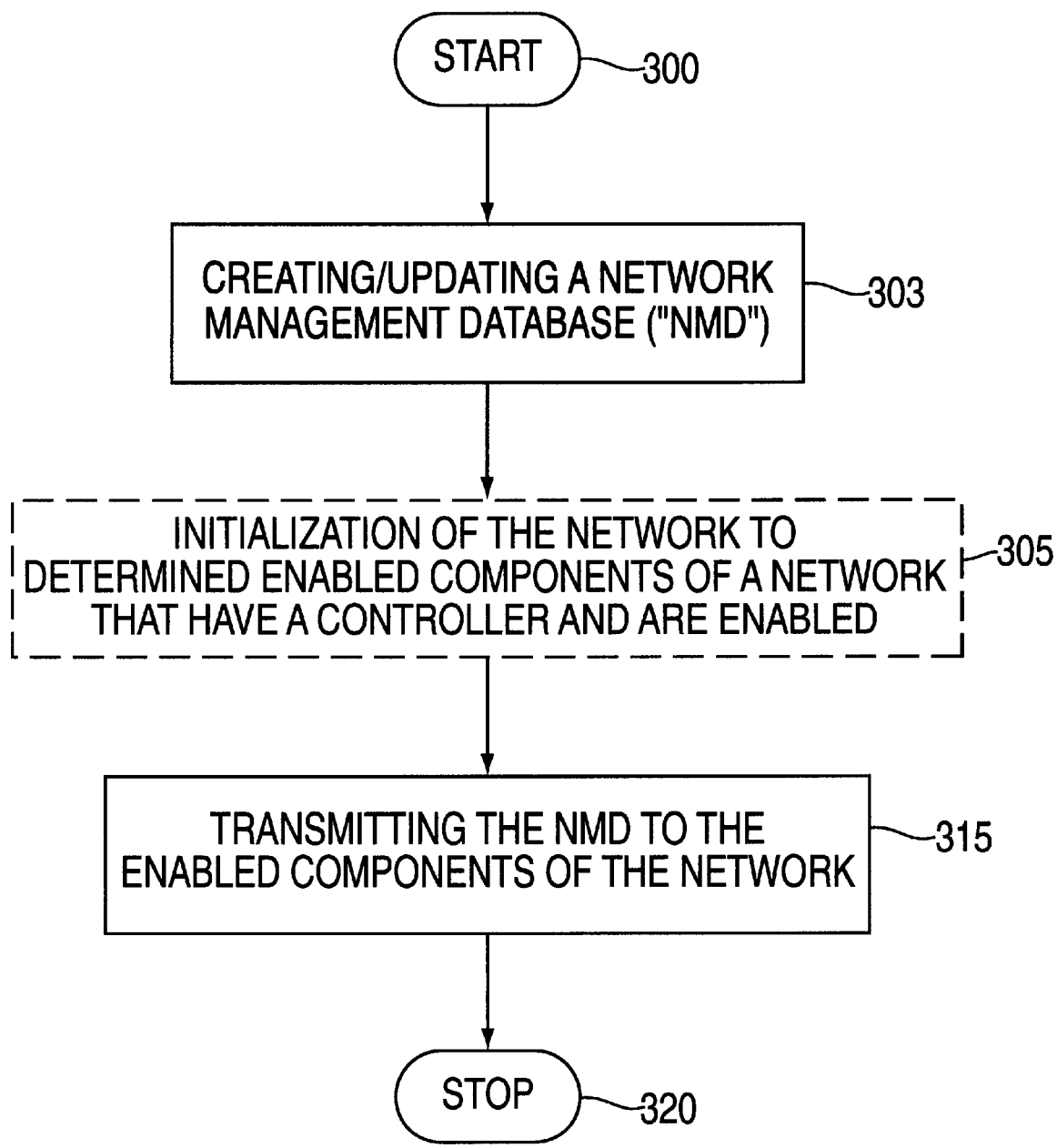
FIG. 4 shows a first phase of a method according to an embodiment of the present invention.

An embodiment of the method according to the present invention includes at least two phases: a first phase and a second phase. The first phase, shown in FIG. 4, begins with creating a Network Management Database ("NMD") 600 or updating NMD 600, if NMD 600 is already in existence (step 303).

NMD 600, shown in FIG. 6a, is a database which contains network policies regarding the usage of network 50. The network policies may be determined, e.g., by a network coordinator. The network policies are stored (e.g., compiled) as queries. Each query may include at least two components: a condition component and an action component (e.g., <Condition, Action>). If the condition component of the query is satisfied, then the action component should be executed.

The condition component for each query may include a filter or plurality of filters combined using logical connectors, such as AND, OR, NOT, etc. For example, the condition component may include the following: "IF source IP address of packet 200 is "User A" AND description field of packet 200 is "Urgent". The action component includes a description of the action(s) that need to be executed upon satisfaction of the condition component. For example, the action component may contain the following: "THEN forward a copy of packet 200 to User B and User C AND set priority of packet 200 to "1".

In an alternative embodiment of the present invention, shown in FIGS. 6b–6d, NMD 600 may have different structures. Instead of including the condition and action components, NMD 600 may include pointers to other databases. For example, the condition component may include at least one pointer to a Filter Database 640 (shown in FIG. 6c) which stores filters. For example, the condition component may include the following: "IF Filter A AND Filter B". Filters A and B include pointers to Filter Database 640 which stores a description of Filter A (e.g., "source IP address is "User A"") and Filter B (e.g., "description field is "Urgent"").

Similarly, the action component may include at least one pointer to an Action Database 680 (shown in FIG. 6d) which stores a description of action(s) that can be taken. For example, the action component may include the following: "THEN Action I AND Action II". Actions I and II include pointers pointing to Action Database 680 where descriptions of Action I and II are stored (e.g., Action I: "send a copy of packet 200 to User B and User C" and Action II: "set priority of packet 200 to "1").

After NMD 600 is created/updated, arrangement 100 may begin initialization of network 50 by determining enabled components of network 50 that have a controller 130 and are currently enabled (i.e., active) (step 305). Alternatively, a list of the enabled components may be provided to arrangement 100. Then, arrangement 100 transmits NMD 600 to the enabled components of network 50 (step 315). NMD 600 may be stored in memory device 120 and/or further memory device 180 of the enabled components. The first phase may be executed by arrangement 100 periodically (preferably, when network's 50 usage is at its lowest level) and/or every time when NMD 600 is updated.

Figure 5:
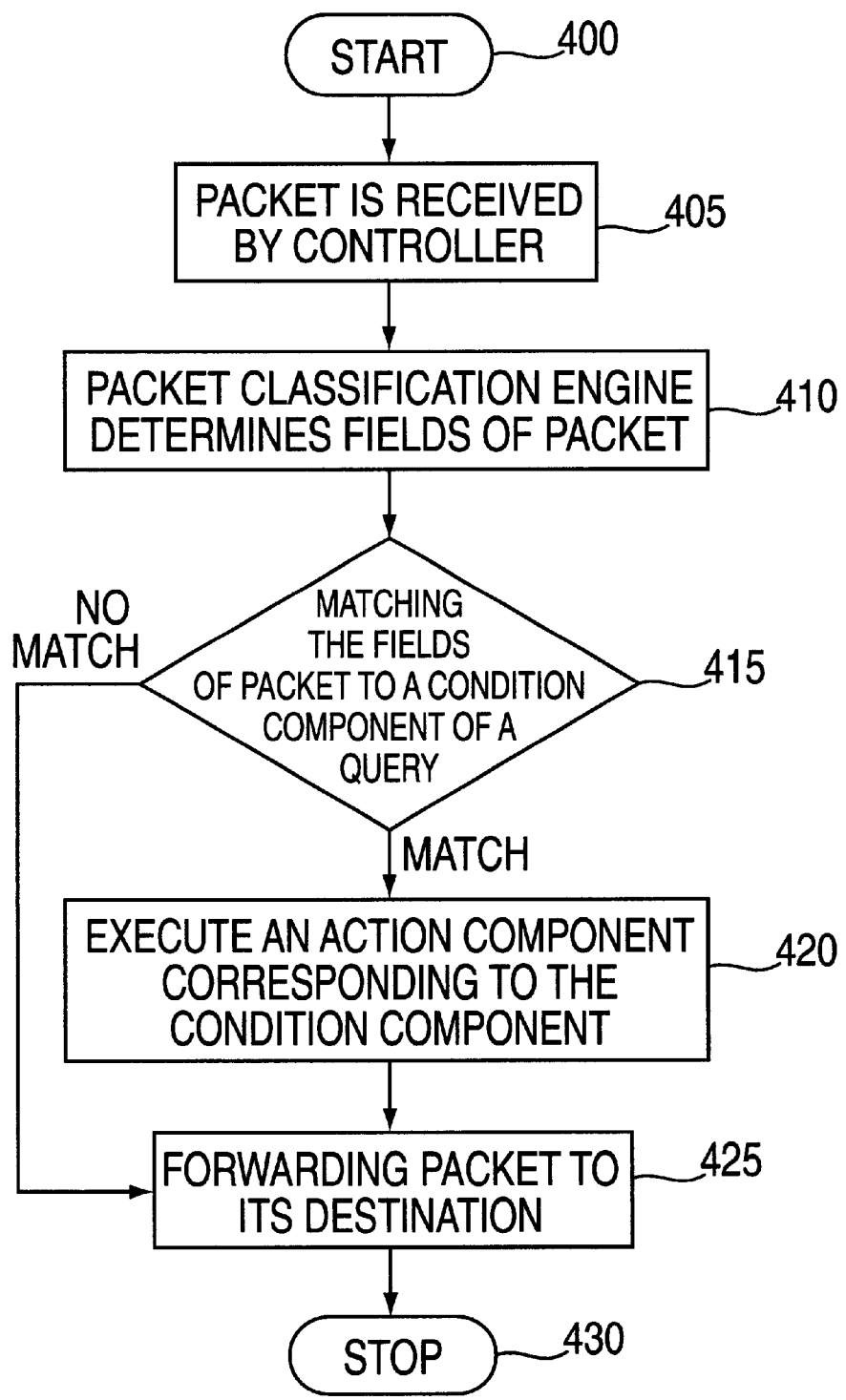
FIG. 5 shows a second phase of the method according to an embodiment of the present invention.

After the completion of the first phase (step 320), the second phase, shown in FIG. 5, begins with packet 200 being received by controller 130 (step 405). Then, controller 130 initiates a Packet Classification Engine ("PCE") which may be implemented as a software application (stored, e.g., together with the software driver and executed by a processor or the like) or as hardware.

First, the PCE determines the fields of packet 200 (step 410). The fields of packet 200 are matched against the condition component of the query(ies) stored in NMD 600 (step 415). If the condition component is satisfied, controller 130 executes the action component (step 420). For example, if packet 200 contains "User A" in source IP address and "Urgent" in description field, then controller 130 would forward a copy of packet 200 to Users B and C, and set priority of packet 200 to "1". Packet 200 would be forwarded by controller 130 to its destination (step 425).

If the condition component is not satisfied, controller 130 can simply forward packet 200 to its destination (step 425). Those skilled in the art would appreciate that the method may be utilized if packet 200 is generated by arrangement 100 and/or if packet 200 is received by controller 130 from a particular component of network 50.

Figure 3B:
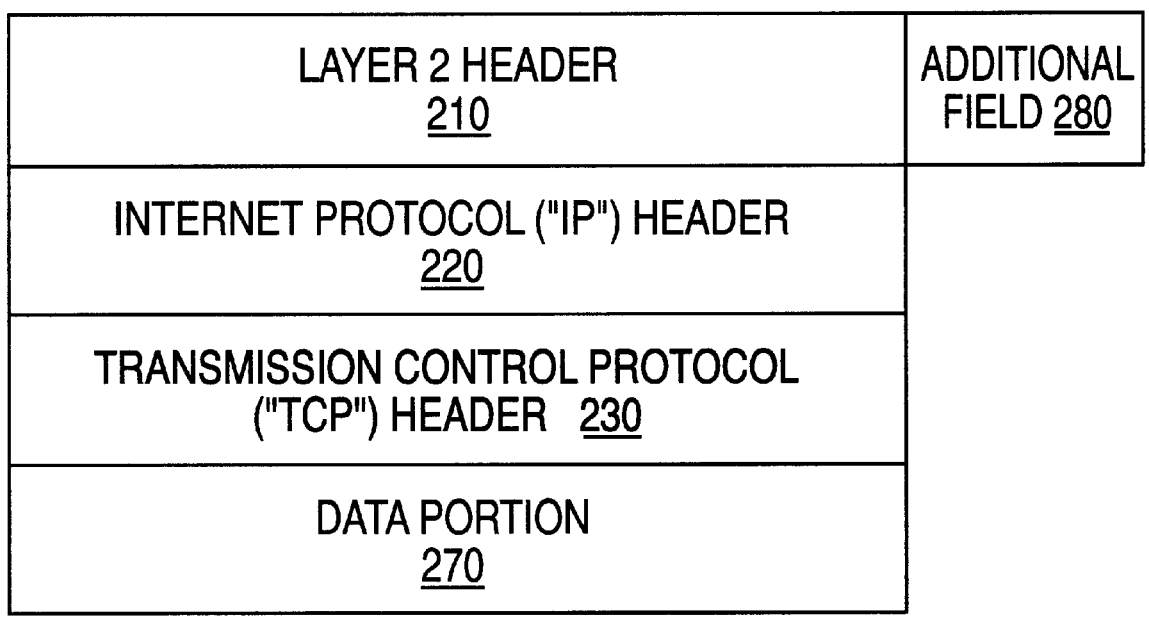
FIG. 3b shows another embodiment of the data packet which includes an additional field according to an embodiment of the present invention.

An advantageous feature of the present invention is that controller 130 may add, delete and/or change any field of packet 200. For example, the action component may include an instruction to set priority of packet 200 to "1". If packet 200 does not have a priority field, then, as shown in FIG. 3b, arrangement 100 would add an additional field 280 (e.g., the priority field) to, e.g., layer 2 header 210 and set it to "1". Similarly, controller 130 may delete and/or edit the additional field 280 or any other fields of packet 200 in real-time or periodically.

Another advantageous feature of the present invention is that the query of NMD 600 may be dynamically (i.e., in real-time) added, deleted and/or changed as a function of a predetermined procedure. In addition, a particular query of NMD 600 may add, delete or update another query of NMD 600.

Furthermore, the PCE may be completely or partially disabled or may be activated only according to a predetermined procedure. If the PCE is completely disabled, controller 130 may be acting, e.g., as a conventional NIC.

An advantage of the present invention is that it may provide intelligence to the conventional NICs by allowing to simplify deployment and management of a number of network functions. In addition, the present invention greatly enhances the performance and manageability of the conventional NICs. Consequently, performance, control, and remote management of network 50 may be optimized.

The present invention adds a flexible and extensible architecture to controller 130 and the PCE. The PCE also enables network management functions from both local and remote management stations (i.e., from arrangement 100 and the enabled components of network 50). Furthermore, the present invention allows a flexible classification of packet 200 based on any combination of the fields of packet 200. All of that can be achieved without significant changes in conventional network applications or conventional network protocol.

In addition, utilizing controller 130 with further processor 140 and further memory device 180 allows for a faster transmission of packet 200 to and from arrangement 100.

Furthermore, the present invention allows a traffic prioritization within network 50. Movement of packets 200 within network 50 may be controlled (i.e., prioritized) by assigning at least one priority value to each packet 200. For example, a particular packet 200 may receive a predetermined priority based on at least one predetermined condition, e.g., source address and/or destination address (e.g., all packets 200 from user X to user Y will receive a priority 1). Network 50 will "treat" packet 200 according to its priority.

In addition, the traffic prioritization ensures that a mission-critical and delay-sensitive packet 200 gets to its destination in a timely manner. Controller 130 may prioritize packet 200 using a type-of-service field in the Internet Protocol Suite (Internet RFC 1349, July 1992), differentiated services for Internet Protocol Suite (see Definition of the Differentiated Services Fields in IPv4 and IPv6 Headers, Internet Draft, <draft_iepf_diffsew_headers_04.txt>, Oct. *19, 1998* and the Institute of Electrical and Electronics Engineers, Inc. ("IEEE") 802.1p priority. IEEE 802.1p "Standard for Local and Metropolitan Area Networks— Supplement to Media Access Control (MAC) Bridges: Traffic Class Expediting and Dynamic Multicast Filtering" has been incorporated into IEEE Std 802.1D-1998).

The present invention also provides for an intelligent monitoring of network 50. Controller 130 may control and monitor network 50 by collecting statistical information on the movement of packets 200 within network 50. The statistical information may include, e.g., information on a number of packets 200 received from a particular user and/or arrangement 100. Also, the present invention allows the tracking of the enabled components of network 50 that have controller 130.

Furthermore, the present invention allows a remote configuration and control of network 50. Components of network 50 may be configured and re-configured remotely using controller 130, NMD 600 and the method according to the present invention. The present invention eliminates the need to individually configure each particular component of network 50. Otherwise, the network coordinator would have to configure, e.g., only arrangement 100, and then update NMDs 600 of all of the enabled components.

The policies and/or resources of network 50 may be flexibly and instantaneously adjusted based on the network usage, e.g., as determined by statistical information. For instance, if the network coordinator notices that a particular component of network 50 is overloaded, the network coordinator may allocate additional components to the particular component. Such allocation can be done by adjusting NMD 600 and providing that information to all enabled components of network 50. The adjustments may be done in real-time (i.e., instantaneously, e.g., as soon as any predetermined changes in the pattern of packets' 200 movements are detected) or periodically.

Controller 130 also provides a support, e.g., for Remote Monitoring ("RMON") counters or the like. (See Remote Network Monitoring Management Information Base, Internet RFC 1757, February 1995; and Remote Network Monitoring Management Information Base, version 2, Internet RFC 2021, January 1997).

In addition, the present invention allows an easy introduction of the network policies to control traffic of a particular component of network 50 based on predetermined criteria.

The present invention also facilitates a creation of, e.g., a virtual network ("VN") such as a Virtual Local Area Network ("VLAN") and/or a Virtual Wide Area Network ("VWAN"). The virtual network may be created by generating a query for NMD 600. For instance, the query may include the following: if packet 200 is received from User A and a description field is "VN Alpha", then controller 130 must forward a copy of packet 200 to every member of the VN Alpha; the VN Alpha includes users X, Y, Z. When packet 200 is received by controller 130 upon satisfaction of the above-described exemplary condition component, a copy of packet 200 will be forwarded to users X, Y, Z. In addition, the present invention provides support for VN tagging (e.g., IEEE 802.1Q-1998). (See, IEEE, "Frame Extension for Virtual Bridge Local Area Network (VLAN) Tagging on 802.3 Network," reported in IEEE Std. 802.1Q).

Several embodiments of the present invention are specifically illustrated and/or described herein. However, it will be appreciated that modifications and variations of the present invention are covered by the above teachings and within the purview of the appended claims without departing from the spirit and intended scope of the present invention.

What is claimed is:

1. A method for managing a network, said network coupling a first component and a second component, the method comprising:

generating a database, said database including filter data having at least one condition and action data corresponding to said at least one condition;

transmitting a data packet from said first component to said second component via said network, said data packet including a plurality of fields and data; and filtering said fields of said data packet at said second component to determine if said at least one condition is satisfied.

2. The method according to claim 1, further comprising:

storing said database in said first component;

transmitting said database to said second component; and executing said action data corresponding to said at least one condition when said at least one condition is satisfied.

3. A method for managing a network, said network coupling at least a first component and a remote component, the method comprising:

transmitting a database from said first component to said remote component via said network, said database including filter data having at least one condition and action data corresponding to said at least one condition;

transmitting a data packet from said first component to said remote component via said network, said data packet including a plurality of fields and data; and filtering said fields of said data packet at said remote component to determine if said at least one condition is satisfied.

4. The method according to claim 3, further comprising:

executing said action data corresponding to said at least one condition when said at least one condition is satisfied.

5. The method according to claim 3, wherein said at least one condition includes a plurality of conditions which are connected using at least one logical connector.

6. The method according to claim 3, wherein said action data includes a plurality of action portions which are connected using at least one logical connector.

7. The method according to claim 3, further comprising:

determining a presence of a further remote device coupled to said network; and transmitting said database to said further remote device.

8. The method according to claim 7, further comprising:

remotely controlling said further remote device with at least one of said first component and said remote component.

9. The method according to claim 3, further comprising:
updating said database according to a predetermined procedure using said first component.

10. The method according to claim 3, further comprising:
transmitting, using said first component, said database to said remote component during a predefined time period.

11. The method according to claim 3, further comprising:
when said database is updated, instantaneously transmitting said database to said remote component using said first component.

12. The method according to claim 3, further comprising:
adding a further field to said plurality of fields using at least one of said first component and said remote component.

13. The method according to claim 3, further comprising:
at least one of updating and deleting at least one field of said plurality of fields using at least one of said first component and said remote component.

14. The method according to claim 3, further comprising:
updating said database to enable at least one of said first component and said remote component to assign at least one priority code to said data packet according to a predetermined procedure.

15. The method according to claim 3 further comprising:
updating said database to enable monitoring of said network to determine monitoring information using at least one of said first component and said remote component according to a predetermined procedure.

16. The method according to claim 15, further comprising:
instantaneously updating said database as a function of the monitoring information.

17. The method according to claim 3, further comprising:
updating said database to create a predetermined virtual network of said network using at least one of said first component and said remote component.

18. The method according to claim 3, further comprising:
updating said database to configure said network using at least one of said first component and said remote component according to a predetermined procedure.

19. A system for managing a network, said system coupled to said network and comprising:
a memory device storing a database, said database including filter data which has at least one condition and action data, said action data corresponding to at least one condition;
a communication device; and
a processor coupled to said memory device and said communication device, said processor transmitting a data packet via said communication device to a remote device which is coupled to said network, said data packet including a plurality of fields and data,
wherein at least one of said processor and said remote device filters said fields of said data packet to determine if said at least one condition is satisfied and is enabled to execute said action data when said at least one condition is satisfied.

20. The system according to claim 19, wherein said communication device includes a further processor and a further memory storage, said further processor storing said data packet in said further memory storage before transmitting to said data packet to at least one of said remote device and said processor.

21. The system according to claim 19, wherein at least one of said system and said remote device is at least one of a network server, a network switcher, a network router, a network computer, a personal computer, and a personal digital assistant.

22. The system according to claim 19, wherein said communication device includes a transmission subsystem, the transmission subsystem performing at least one of transmitting and receiving said data packet.

23. The system according to claim 19, wherein said communication device is controlled using a communication driver, the communication driver comprising at least one of a software application and a hardware arrangement.

24. The system according to claim 19, wherein said system is capable of adding a further field to said packet.

25. The system according to claim 19, wherein said system is capable of at least one of deleting and editing at least one field of said plurality of fields.

26. The system according to claim 20, wherein said data packet is stored in at least one of said memory device and said further memory device.

27. The system according to claim 19, wherein said processor transmits said database to said remote device.

28. A computer-readable storage medium storing a set of instructions, the set of instructions capable of being executed by a processor to manage a network which is coupling at least a first component and a remote component, the method comprising:
transmitting a database from said first component to said remote component via said network, said database including filter data having at least one condition and action data corresponding to said at least one condition;
transmitting a data packet from said first component to said remote component via said network, said data packet including a plurality of fields and data; and
filtering said fields of said data packet at said remote component to determine if said at least one condition is satisfied.

29. The computer-readable storage medium according to claim 28, wherein the method further comprising:
executing said action data corresponding to said at least one condition when said at least one condition is satisfied.

* * * * *